US009963992B2

(12) United States Patent
Zheng et al.

(10) Patent No.: US 9,963,992 B2
(45) Date of Patent: May 8, 2018

(54) CENTRIFUGALLY ACTIVATABLE SEAL FOR A ROTARY MACHINE AND METHOD OF ASSEMBLING SAME

(71) Applicant: General Electric Company, Schenectady, NY (US)

(72) Inventors: Xiaoqing Zheng, Niskayuna, NY (US); Michael Dennis Mack, Ballston Spa, NY (US); Neelesh Nandkumar Sarawate, Niskayuna, NY (US); Deepak Trivedi, Halfmoon, NY (US)

(73) Assignee: General Electric Company, Schenectady, NY (US)

( * ) Notice: Subject to any disclaimer, the term of this patent is extended or adjusted under 35 U.S.C. 154(b) by 324 days.

(21) Appl. No.: 14/869,538

(22) Filed: Sep. 29, 2015

(65) Prior Publication Data
US 2017/0089215 A1   Mar. 30, 2017

(51) Int. Cl.
   *F01D 11/02*   (2006.01)
   *F01D 11/12*   (2006.01)
   *F01D 5/02*    (2006.01)

(52) U.S. Cl.
   CPC .............. *F01D 11/127* (2013.01); *F01D 5/02* (2013.01); *F05D 2220/30* (2013.01); *F05D 2230/60* (2013.01); *F05D 2240/56* (2013.01); *F05D 2260/30* (2013.01)

(58) Field of Classification Search
   CPC .... F01D 11/02; F01D 11/025; F05D 2240/56; F05D 2240/59; F16J 15/3288; F16J 15/3292
   See application file for complete search history.

(56) References Cited

U.S. PATENT DOCUMENTS

| 885,032 | A |   | 4/1908  | Ferranti |
|---|---|---|---|---|
| 4,595,207 | A | * | 6/1986  | Popp ..................... F16J 15/3288 277/303 |
| 5,752,802 | A |   | 5/1998  | Jones |
| 5,997,004 | A |   | 12/1999 | Braun et al. |
| 6,173,958 | B1 | * | 1/2001 | Dinc ....................... F01D 9/023 277/303 |
| 6,488,471 | B1 | * | 12/2002 | Stibich .................. F01D 11/001 415/173.3 |
| 6,695,314 | B1 | * | 2/2004 | Gail ....................... F01D 11/001 277/355 |
| 7,578,509 | B2 | * | 8/2009 | Grondahl ............. F16J 15/3292 277/303 |

(Continued)

*Primary Examiner* — Ninh H Nguyen
(74) *Attorney, Agent, or Firm* — Armstrong Teasdale LLP (57) ABSTRACT

A seal for a rotary machine includes a flexible element extending circumferentially about a rotor and extending generally radially from a first end to a free second end. The flexible element is coupled proximate the first end for rotation with the rotor. The flexible element extends at substantially a first angle between at least an intermediate portion of the flexible element and the free second end when the rotor is operating at less than a critical speed, such that a clearance gap is defined between the free second end and a stationary portion. The seal also includes a retaining plate having a stop that orients the flexible element at a second angle proximate the free second end when the rotor is operating at equal to or greater than the critical speed, such that the flexible element forms a dynamic seal between the rotor and the stationary portion.

20 Claims, 5 Drawing Sheets

(56) References Cited

U.S. PATENT DOCUMENTS

2011/0164962 A1 7/2011 Wilson, Jr. et al.
2012/0251303 A1 10/2012 Zheng et al.
2012/0288361 A1 11/2012 Lu et al.

* cited by examiner

CENTRIFUGALLY ACTIVATABLE SEAL FOR A ROTARY MACHINE AND METHOD OF ASSEMBLING SAME

BACKGROUND

The field of the disclosure relates generally to seals for rotary machines, and, more particularly, to a centrifugally activatable seal for a rotary machine.

At least some known rotary machines, including, but not limited to, some known steam turbines, include a seal configured to prevent leakage of a working fluid through gaps between stationary and rotating components. At least some such known seals are configured to provide a clearance between the stationary and rotating components. For at least some such known seals, the clearance is selected to be sufficiently wide to reduce a breakaway torque required to start the rotary machine, and/or to limit an interference with axial movement of the rotating components relative to the stationary components. However, in at least some cases, increasing the width of the clearance to meet such requirements results in a corresponding increase in a residual leakage through the seal.

BRIEF DESCRIPTION

In one aspect, a seal for a rotary machine is provided. The seal includes a flexible element extending circumferentially about a rotor of the rotary machine and extending generally radially from a first end to an opposite, free second end. The flexible element is configured for coupling proximate the first end for rotation with the rotor. The flexible element is configured to extend at substantially a first angle between at least an intermediate portion of the flexible element and the free second end when the rotor is operating at less than a critical speed, such that a clearance gap is defined between the free second end and a stationary portion of the rotary machine. The seal also includes a retaining plate configured for coupling adjacent the flexible element for rotation with the rotor. The retaining plate includes a stop configured to orient the flexible element at a second angle proximate the free second end when the rotor is operating at equal to or greater than the critical speed, such that the flexible element forms a dynamic seal between the rotor and the stationary portion.

In another aspect, a rotary machine is provided. The rotary machine includes a rotor and a stationary portion that extends circumferentially about the rotor. The rotary machine also includes a flexible element extending circumferentially about the rotor and extending generally radially from a first end to an opposite, free second end. The flexible element is coupled proximate the first end for rotation with the rotor. The flexible element is configured to extend at substantially a first angle between at least an intermediate portion of the flexible element and the free second end when said rotor is operating at less than a critical speed, such that a clearance gap is defined between the free second end and the stationary portion. The rotary machine further includes a retaining plate coupled adjacent the flexible element for rotation with the rotor. The retaining plate includes a stop configured to orient the flexible element at a second angle proximate the free second end when the rotor is operating at equal to or greater than the critical speed, such that the flexible element forms a dynamic seal between the rotor and the stationary portion.

In another aspect, a method for assembling a seal of a rotary machine is provided. The method includes coupling a flexible element to a rotor of the rotary machine. The flexible element extends circumferentially about the rotor and extends generally radially from a first end to an opposite, free second end. The flexible element is coupled proximate the first end for rotation with the rotor. The flexible element is configured to extend at substantially a first angle between at least an intermediate portion of the flexible element and the free second end when the rotor is operating at less than a critical speed, such that a clearance gap is defined between the free second end and a stationary portion of the rotary machine. The method also includes coupling a retaining plate to the rotor adjacent the flexible element for rotation with the rotor. The retaining plate includes a stop configured to orient the flexible element at a second angle proximate the free second end when the rotor is operating at equal to or greater than the critical speed, such that the flexible element forms a dynamic seal between the rotor and the stationary portion.

DETAILED DESCRIPTION

The embodiments described herein provide a seal that includes a flexible element and a retaining plate coupled to a rotor. More specifically, a free, radially outer end of the flexible element is configured to extend at a first angle when the rotor operates below a critical speed, providing a clearance gap between the flexible element and a stationary portion of the rotary machine. Additionally, a stop on the retaining plate is configured to hold the free outer end at a second angle when the rotor operates at or above the critical speed, such that a dynamic seal is formed by the flexible element and the stationary portion.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
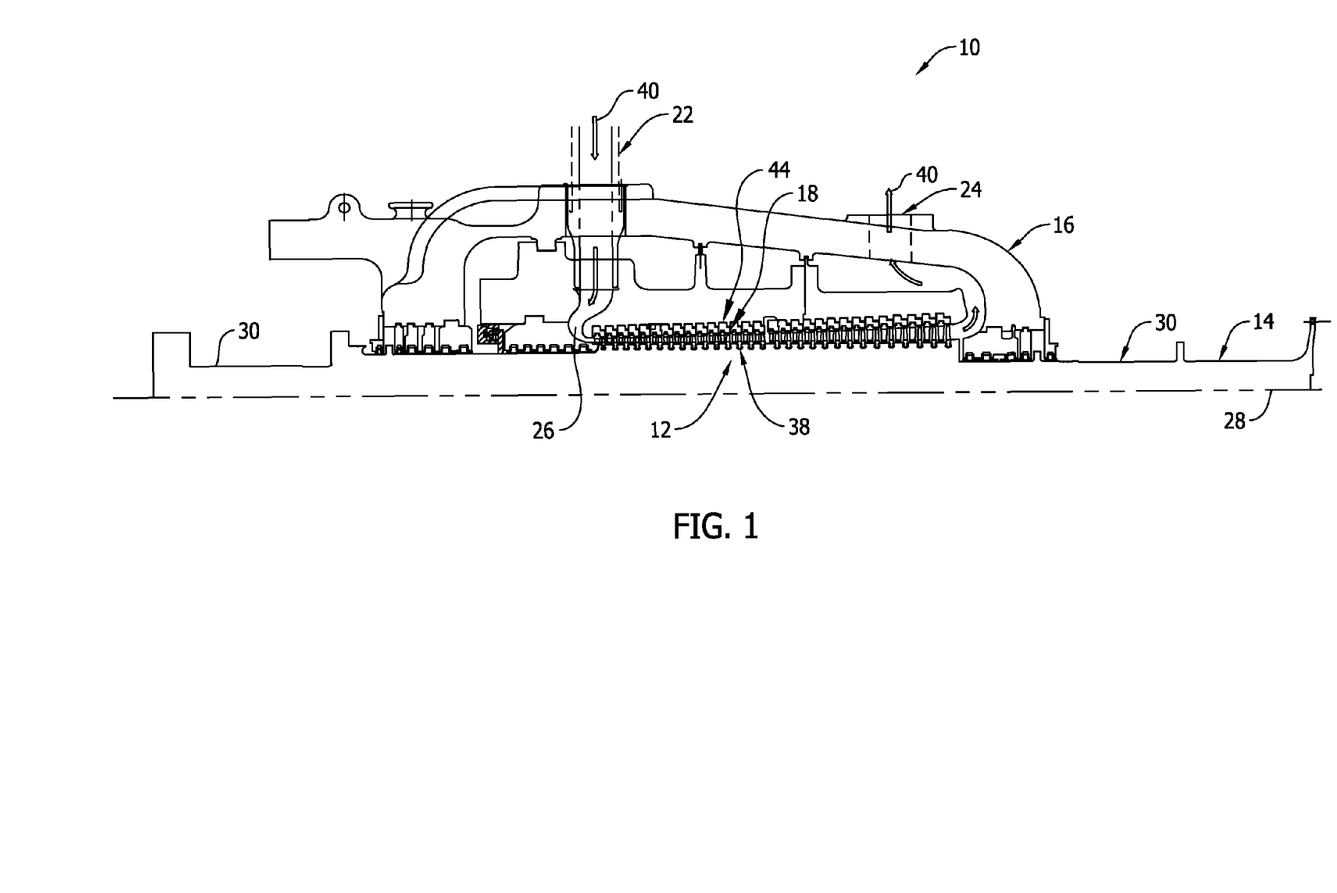
FIG. 1 is a schematic view of an exemplary rotary machine.

FIG. 1 is a schematic view of an exemplary rotary machine 10. In the exemplary embodiment, rotary machine 10 is a single-flow steam turbine. In alternative embodiments, rotary machine 10 is an opposed-flow steam turbine. In other alternative embodiments, rotary machine 10 is any other suitable rotary machine system, such as a gas turbine.

In the exemplary embodiment, rotary machine 10 includes a plurality of turbine stages 12. Each turbine stage 12 includes a plurality of circumferentially disposed rotor blades 38 coupled to a rotor 14. It should be noted that, as used herein, the term "couple" is not limited to a direct mechanical, electrical, and/or communication connection between components, but may also include an indirect mechanical, electrical, and/or communication connection between multiple components. Rotor blades 38 extend radially outward from rotor 14. Plurality of rotor blades 38 includes any suitable number of rotor blades 38 that enables rotary machine 10 to operate as described herein. Rotor 14 is supported at opposing end portions 30 of rotor 14 by bearings (not shown).

A casing 16 surrounds plurality of turbine stages 12. A plurality of diaphragms 18 is coupled to casing 16, such that a respective diaphragm 18 is positioned upstream of each turbine stage 12. Each diaphragm 18 includes a plurality of circumferentially disposed partitions 44. Partitions 44 are generally airfoil shaped and extend radially inward from casing 16.

Rotary machine 10 includes a high pressure steam inlet 22 and a low pressure steam exhaust 24. Rotor 14 is rotatable about a centerline axis 28. During operation, high-pressure and high-temperature steam 40 is channeled from a steam source, such as a boiler or the like (not shown), through HP steam inlet 22 into an inlet 26. From inlet 26, steam 40 is channeled in a downstream direction 32 through casing 16, where it encounters turbine stages 12. As the steam impacts rotor blades 38, it induces rotation of rotor 14 about centerline axis 28. Thus, thermal energy of steam 40 is converted to mechanical rotational energy by turbine stages 12. Steam 40 exits casing 16 at low pressure steam exhaust 24. Steam 40 is then channeled to the boiler (not shown), where it is reheated, and/or to other components of the system, for example, a low pressure turbine section or a condenser (not shown).

Figure 2:
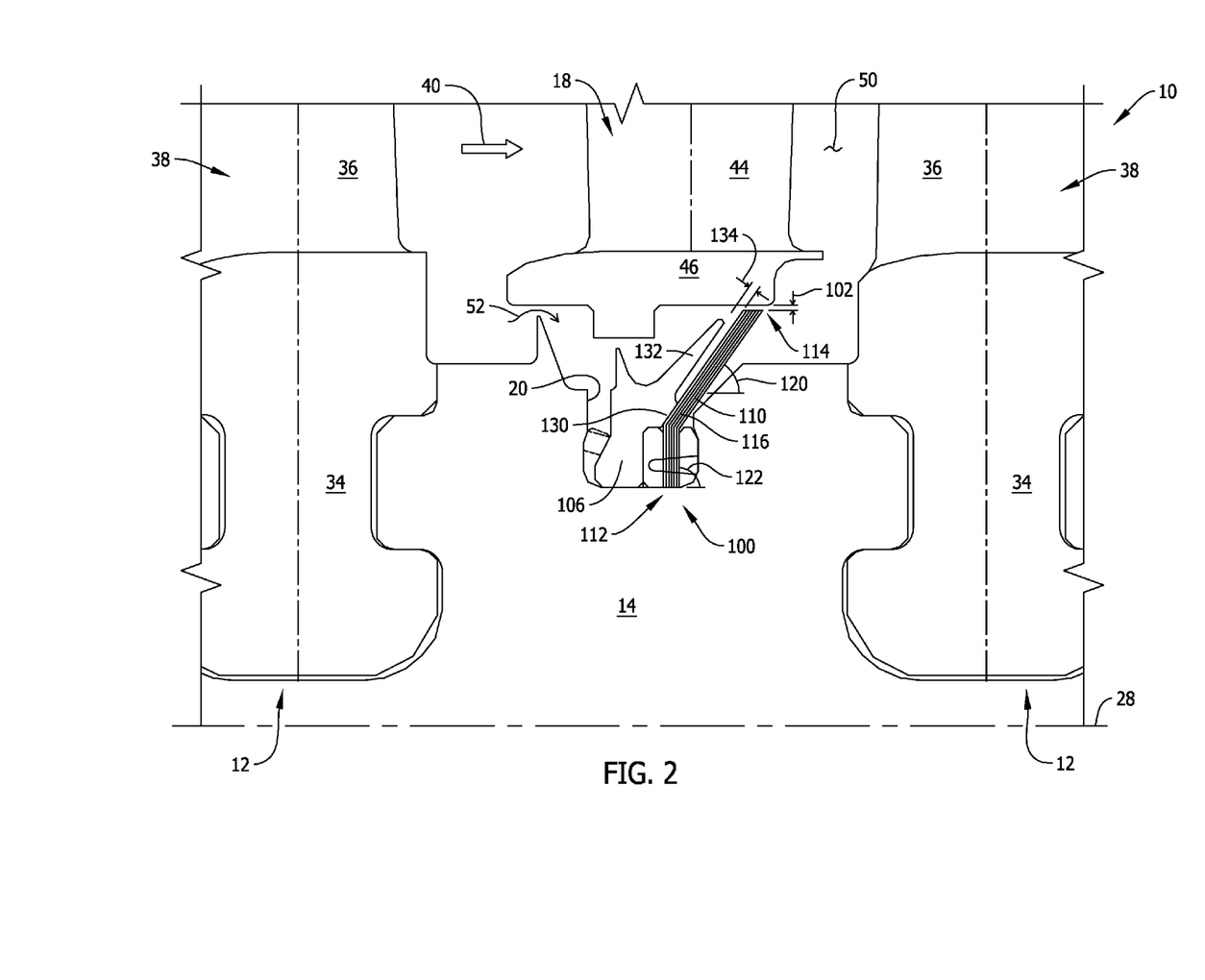
FIG. 2 is a schematic sectional view of a first exemplary embodiment of a centrifugally activatable seal in a first operating state coupled to the exemplary rotary machine shown in FIG. 1.
Figure 3:
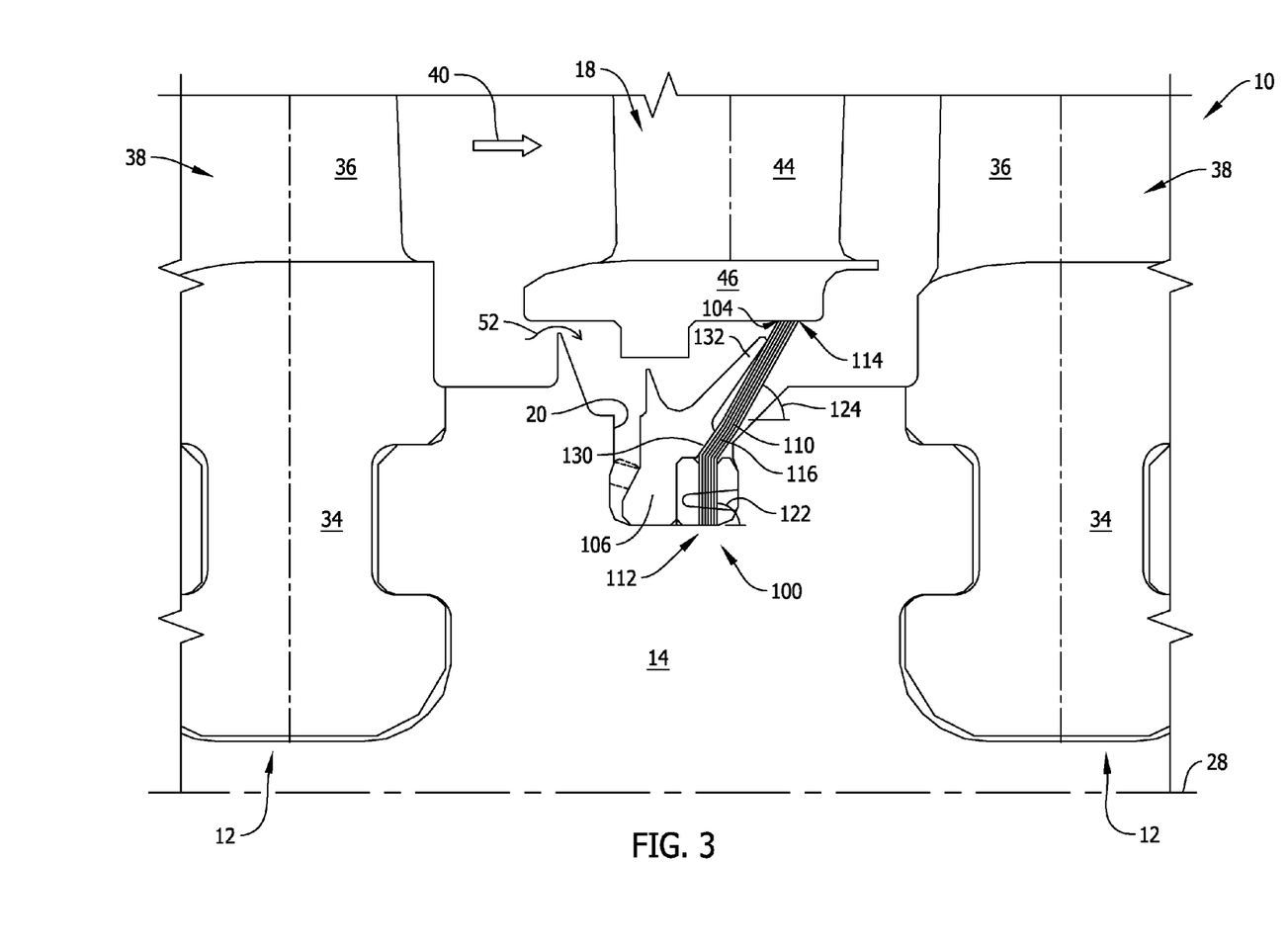
FIG. 3 is a schematic sectional view of the first exemplary embodiment of the centrifugally activatable seal in a second operating state coupled to the exemplary rotary machine shown in FIG. 1.

FIG. 2 is a schematic sectional view of a first exemplary embodiment of a centrifugally activatable seal 100 in a first operating state coupled to rotary machine 10. FIG. 3 is a schematic sectional view of seal 100 in a second operating state coupled to rotary machine 10. Seal 100 in the first operating state is configured to define a clearance gap 102, as shown in FIG. 2, between rotor 14 and diaphragm 18. Seal 100 in the second operating state is configured to form a dynamic seal 104, as shown in FIG. 3, between rotor 14 and diaphragm 18.

With reference to FIGS. 2 and 3, in the exemplary embodiment, each rotor blade 38 includes an airfoil 36 and a root 34. Each root 34 is coupled to rotor 14 in any suitable fashion, such that rotor blades 38 rotate with rotor 14. Also in the exemplary embodiment, rotary machine 10 includes a stationary portion 46 that extends circumferentially about rotor 14. For example, but not by way of limitation, stationary portion 46 is an inner ring of diaphragm 18 coupled to a radially inner end of each partition 44 in any suitable fashion, such that stationary portion 46 is stationary with respect to rotor 14. Alternatively, stationary portion 46 is any suitable stationary portion of rotary machine 10.

Rotor blade airfoils 36 and partitions 44 are disposed within a primary flow path 50 of steam 40. In addition, a leakage flow path 52 is defined generally between stationary portion 46 and rotor 14. Seal 100 is coupled to rotor 14 between stationary portion 46 and rotor 14, such that seal 100 rotates with rotor 14.

In the exemplary embodiment, seal 100 includes a retaining plate 106 and a flexible element 110. Each of retaining plate 106 and flexible element 110 extends circumferentially about rotor 14. In certain embodiments, retaining plate 106 is formed from a plurality of arcuate segments that cooperate to form a substantially continuous ring around rotor 14. In some alternative embodiments, retaining plate 106 extends circumferentially around less than an entirely of rotor 14. Moreover, in certain alternative embodiments, retaining plate 106 is formed from a single arcuate segment.

Retaining plate 106 is coupled for rotation with rotor 14. For example, retaining plate 106 is fixed to rotor 14 in any suitable fashion that enables seal 100 to function as described herein. In the exemplary embodiment, retaining plate 106 is positioned at least partially within a circumferentially extending groove 20 defined in rotor 14 between adjacent turbine stages 12. In alternative embodiments, retaining plate 106 is positioned on rotor 14 in any suitable fashion that enables seal 100 to function as described herein.

In certain embodiments, flexible element 110 is formed from a plurality of arcuate segments that cooperate to form a substantially continuous ring around rotor 14. In some alternative embodiments, flexible element 110 extends circumferentially around less than an entirely of rotor 14. Moreover, in certain alternative embodiments, flexible element 110 is formed from a single arcuate segment.

Flexible element 110 extends generally radially outward from a first end 112 to an opposite free second end 114. Flexible element 110 is coupled, proximate first end 112, for rotation with rotor 14. For example, flexible element 110 is fixed to at least one of rotor 14 and retaining plate 106 in any suitable fashion that enables seal 100 to function as described herein. In the exemplary embodiment, flexible element 110 is positioned adjacent to retaining plate 106. More specifically, flexible element 110 is positioned adjacent to, and downstream from, retaining plate 106 at least partially within groove 20. In alternative embodiments, flexible element 110 is positioned in any suitable fashion that enables seal 100 to function as described herein.

In the exemplary embodiment, flexible element 110 includes a plurality of brush bristles, such as, but not limited to, a variable diameter bristle pack. In alternative embodiments, flexible element 110 includes a plurality of circumferentially spaced flexible fingers. In other alternative embodiments, flexible element 110 includes at least one circumferentially extending thin plate. In some such embodiments, the at least one thin plate is a plurality of thin plates. Further, in some such embodiments, at least one of the thin plates circumferentially overlaps another of the thin plates. In still other alternative embodiments, flexible element 110 includes any suitably flexible structure that enables seal 100 to function as described herein.

In the first operating state, flexible element 110 is configured to extend between at least an intermediate portion 116 and second end 114 at a first angle 120 with respect to centerline axis 28. First angle 120 is selected such that second end 114 is separated from stationary portion 46 by clearance gap 102. More specifically, in the exemplary embodiment, first angle 120 is selected such that clearance gap 102 is sufficiently wide to reduce a breakaway torque required to start rotary machine 10, and/or sufficiently wide to limit an interference with axial movement of rotor 14 relative to stationary portion 46.

In the exemplary embodiment, retaining plate 106 includes protrusion 130 configured to orient intermediate portion 116 of flexible element 110 at first angle 120. More specifically, first end 112 of flexible element 110 extends from rotor 14 at a base angle 122, and protrusion 130 is configured to couple against intermediate portion 116 of flexible element 110 such that flexible element 110 bends to first angle 120 at intermediate portion 116. For example, but not by way of limitation, base angle 122 is 90 degrees, and protrusion 130 defines a rigid, circumferentially extending face disposed at first angle 120 with respect to centerline axis 28. In alternative embodiments, seal 100 includes any other suitable structure configured to orient intermediate portion 116 at first angle 120.

Moreover, in the exemplary embodiment, flexible element 110 has a stiffness sufficient to orient free second end 114 at first angle 120 when rotor 14 is operating at less than a critical speed. Moreover, the stiffness of flexible element 110 is overcome by a centrifugal force induced by rotor 14 operating at or above the critical speed, such that an angle at which second end 114 extends increases beyond first angle 120. Thus, the critical speed is defined as the rotational speed at which the stiffness of flexible element 110 is overcome by the centrifugal force induced by the rotation of rotor 14 about centerline axis 28, causing the angle at which second end 114 extends to increase beyond first angle 120. It should be understood that rotor 14 operating at less than the critical speed includes rotor 14 being stopped, that is, rotating at zero speed. Thus, in certain embodiments, the stiffness of flexible element 110 facilitates maintaining clearance gap 102 during start-up operation of rotor 14, until rotor 14 reaches the critical speed.

In the second operating state, flexible element 110 extends proximate second end 114 at a second angle 124 with respect to centerline axis 28. Second angle 124 is selected such that clearance gap 102 between second end 114 and stationary portion 46 is reduced or eliminated. More specifically, in the exemplary embodiment, second angle 124 is selected such that flexible element 110 forms dynamic seal 104 between rotor 14 and stationary portion 46.

In the exemplary embodiment, retaining plate 106 includes a circumferentially extending stop 132 configured to orient flexible element 110 at second angle 124 proximate second end 114 while rotor 14 is operating at equal to or greater than the critical speed. More specifically, stop 132 is positioned in spaced relation to protrusion 130 such that, in the first operating state, a space 134 is defined between stop 132 and second end 114 of flexible element 110. In the second operating state, when the induced centrifugal force overcomes the stiffness of flexible element 110 and causes the angle at which second end 114 extends to increase beyond first angle 120, stop 132 couples against, and at least partially supports, flexible element 110 proximate second end 114. Thus, stop 132 is configured to retain flexible element 110 at second angle 124 proximate second end 114 in the second operating state. Stop 132 thus provides a consistent positioning of flexible element 110 relative to stationary portion 46 at any rotor speed greater than the critical speed, facilitating consistent sealing performance of dynamic seal 104. For example, but not by way of limitation, stop 132 presents a rigid, circumferentially extending tip that intercepts flexible element 110 as flexible element 110 rotates radially outward when the critical speed is exceeded. In alternative embodiments, seal 100 includes any other suitable structure configured to orient flexible element 110 proximate second end 114 at second angle 124 while rotor 14 is operating at equal to or greater than the critical speed.

Thus, in certain embodiments, the selected stiffness of flexible element 110 facilitates centrifugal activation of seal 100 when rotor 14 reaches the critical speed. Moreover, stop 132 is positioned to facilitate replacing clearance gap 102 with dynamic seal 104 when rotor 14 reaches and/or exceeds the critical speed. Moreover, the critical speed causes seal 100 to centrifugally activate despite the relatively higher pressure of steam 40 upstream from seal 100, which tends to counteract the centrifugal force on flexible element 110 induced by rotation of rotor 14.

Figure 4:
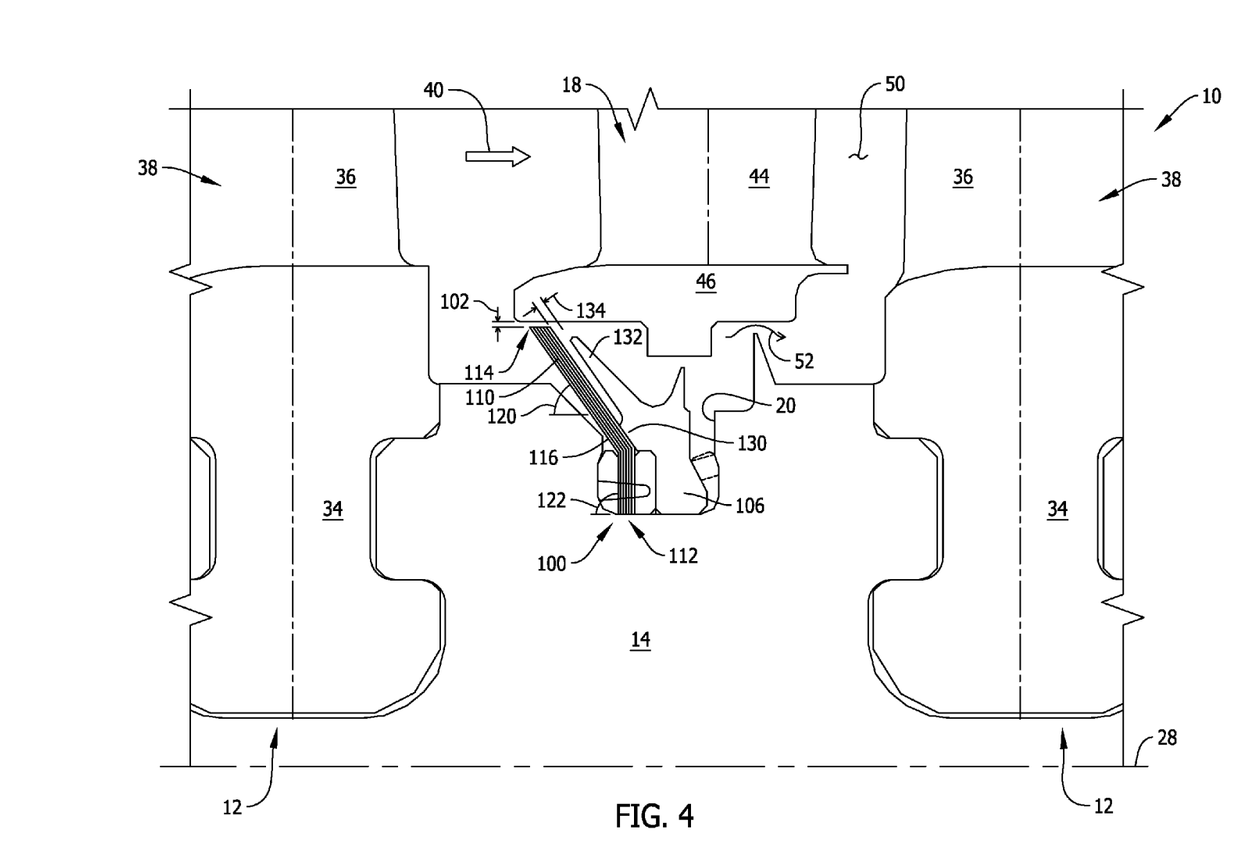
FIG. 4 is a schematic sectional view of a second exemplary embodiment of the centrifugally activatable seal in the first operating state coupled to the exemplary rotary machine shown in FIG. 1.

FIG. 4 is a schematic sectional view of a second exemplary embodiment of centrifugally activatable seal 100 in the first operating state coupled to rotary machine 10. The second embodiment shown in FIG. 4 is identical to the first embodiment shown in FIGS. 2 and 3, and like parts are labeled identically. Seal 100 in the first operating state is again configured to define clearance gap 102, as shown in FIG. 4, between rotor 14 and diaphragm 18, while seal 100 in the second operating state is configured to form dynamic seal 104 (not shown in FIG. 4), in a fashion similar to that shown in FIG. 3, between rotor 14 and diaphragm 18.

As with the embodiment of FIGS. 2 and 3, flexible element 110 is positioned adjacent to retaining plate 106 and coupled for rotation with rotor 14. In contrast to the embodiment in FIGS. 2 and 3, however, flexible element 110 is positioned upstream from retaining plate 106 in the embodiment shown in FIG. 4. In alternative embodiments, flexible element 110 is positioned in any suitable fashion that enables seal 100 to function as described herein.

Similar to the embodiment shown in FIGS. 2 and 3, in the first operating state, flexible element 110 extends between at least intermediate portion 116 and second end 114 at first angle 120 with respect to centerline axis 28, and first angle 120 is again selected such that second end 114 is separated from stationary portion 46 by clearance gap 102. Moreover, in the exemplary embodiment, the stiffness of flexible element 110 is again selected such that flexible element 110 beyond intermediate portion 116 also extends substantially at first angle 120 while rotor 14 is operating at less than the critical speed.

Also similar to the embodiment shown in FIGS. 2 and 3, in the second operating state, flexible element 110 extends proximate second end 114 at second angle 124 (shown in FIG. 3) with respect to centerline axis 28, and second angle 124 is again selected such that clearance gap 102 between second end 114 and stationary portion 46 is reduced or eliminated and dynamic seal 104 is formed between rotor 14 and stationary portion 46. In contrast to the embodiment in FIGS. 2 and 3, however, the relatively higher pressure of steam 40 upstream from seal 100 tends to cooperate with the centrifugal force on flexible element 110 induced by rotation of rotor 14 to push flexible element 110 from the first operating state towards the second operating state. Thus, in certain embodiments, the stiffness of flexible element 110 in the embodiment of FIG. 4 must be selected to be greater than the stiffness of flexible element 110 in FIGS. 2 and 3 to obtain centrifugal activation at an identical critical speed of rotor 14.

Figure 5:
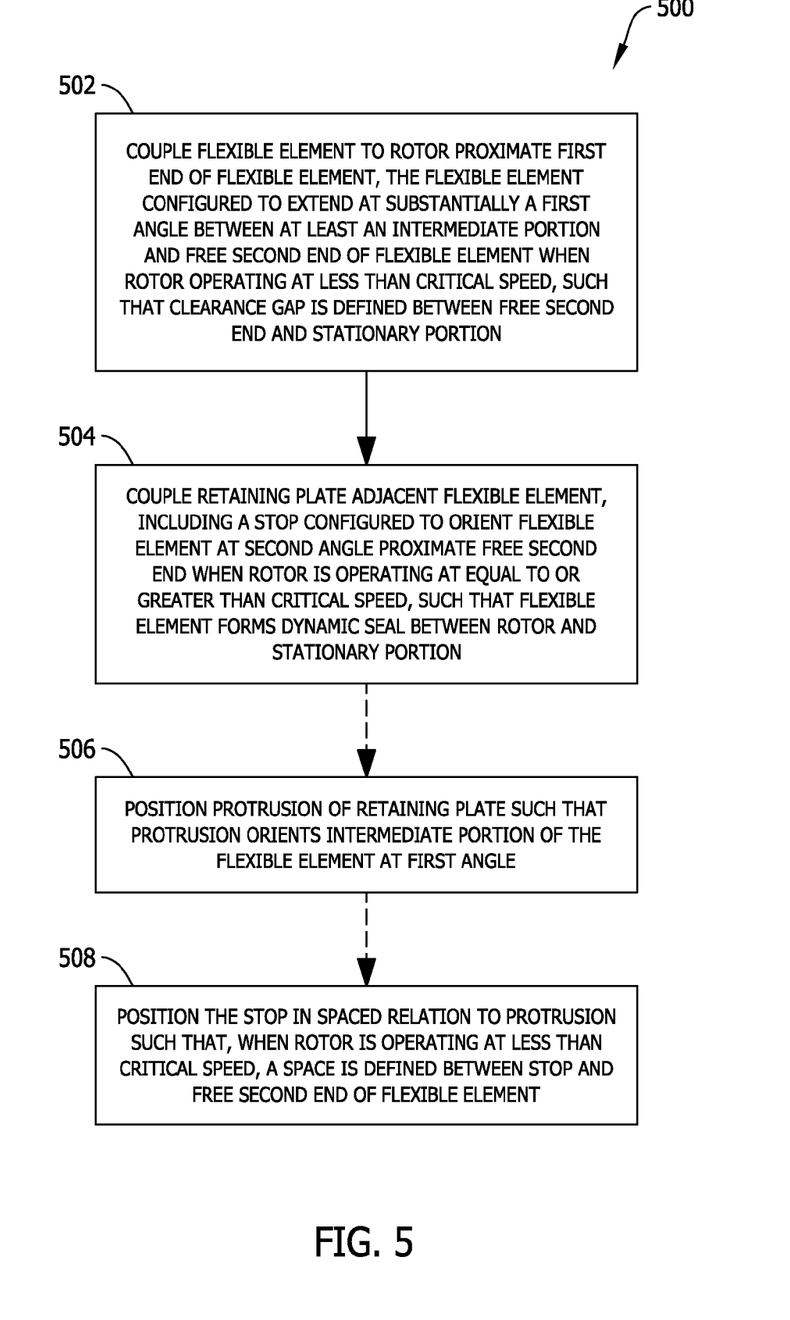
FIG. 5 is a flow diagram of an exemplary method of assembling a seal, such as the exemplary seal shown in any of FIGS. 2-4, of a rotary machine, such as the exemplary rotary machine shown in FIG. 1.

An exemplary method 500 of assembling a seal, such as seal 100, of a rotary machine, such as rotary machine 10, is illustrated in the flow diagram of FIG. 5. With reference also to FIGS. 1-4, in the exemplary embodiment, method 500 includes coupling 502 a flexible element, such as flexible element 110, to a rotor, such as rotor 14, of the rotary machine. The flexible element extends circumferentially about the rotor and extends generally radially from a first end, such as first end 112, to an opposite, free second end, such as second end 114. The flexible element is coupled proximate the first end for rotation with the rotor. The flexible element is configured to extend at substantially a first angle, such as first angle 120, between at least an intermediate portion of the flexible element, such as intermediate portion 116, and the free second end when the rotor is operating at less than a critical speed, such that a clearance gap, such as clearance gap 102, is defined between the free second end and a stationary portion, such as stationary portion 46, of the rotary machine.

In the exemplary embodiment, method 500 further includes coupling 504 a retaining plate, such as retaining plate 106, to the rotor adjacent to the flexible element for rotation with the rotor. The retaining plate includes a stop, such as stop 132, configured to orient the flexible element at a second angle, such as second angle 124, proximate the free second end when the rotor is operating at equal to or greater than the critical speed, such that the flexible element forms a dynamic seal, such as dynamic seal 104, between the rotor and the stationary portion.

In certain embodiments, the step of coupling 504 the retaining plate further includes positioning 506 a protrusion of the retaining plate, such as protrusion 130, such that the protrusion orients the intermediate portion of the flexible element at the first angle. In some embodiments, the step of coupling 504 the retaining plate further includes positioning 508 the stop in spaced relation to the protrusion such that, when the rotor is operating at less than the critical speed, a space, such as space 134, is defined between the stop and the free second end of the flexible element.

Exemplary embodiments of a centrifugally activatable seal for a rotary machine, and method of assembling the seal, are described above in detail. The embodiments provide advantages over known seals in that, when the rotor is operating below a critical speed, the embodiments provide a clearance gap between a flexible element of the seal and a stationary portion of the rotary machine. The clearance gap is sufficiently wide to reduce a breakaway torque required to start the rotary machine, and/or sufficiently wide to limit an interference with axial movement of the rotor relative to the stationary portion during start-up. The embodiments provide further advantages in that a stiffness of the flexible element is overcome by a centrifugal force induced by the rotor operating at or above the critical speed, such that the flexible element rotates outward and the clearance gap is reduced or eliminated, forming a dynamic seal between the rotor and the stationary portion. The embodiments provide further advantages in that a retaining plate of the seal stops the flexible element at a selected angle when the rotor is operating at or above the critical speed, facilitating a consistent positioning of the flexible element at any rotor speed greater than the critical speed and, thus, consistent seal performance.

The centrifugally activatable seal and methods described above are not limited to the specific embodiments described herein, but rather, components of the apparatus and/or steps of the methods may be utilized independently and separately from other components and/or steps described herein. For example, the exemplary embodiments can be implemented and utilized in connection with many other rotary machines.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A seal for a rotary machine, said seal comprising:
a flexible element extending circumferentially about a rotor of the rotary machine and extending generally radially from a first end to an opposite, free second end, said flexible element configured for coupling proximate said first end for rotation with the rotor, said flexible element configured to extend at substantially a first angle between at least an intermediate portion of said flexible element and said free second end when the rotor is operating at less than a critical speed, such that a clearance gap is defined between said free second end and a stationary portion of the rotary machine, wherein said flexible element comprises a stiffness sufficient to orient said free second end at the first angle when the rotor is operating at less than the critical speed, and wherein said stiffness is overcome by a centrifugal force induced by the rotor operating at or above the critical speed, such that an angle at which said free second end extends increases beyond the first angle; and
a retaining plate configured for coupling adjacent said flexible element for rotation with the rotor, said retaining plate comprising a stop configured to orient said flexible element at a second angle proximate said free second end when the rotor is operating at equal to or greater than the critical speed, such that said flexible element forms a dynamic seal between the rotor and the stationary portion.

2. The seal of claim 1, wherein said flexible element comprises a plurality of brush bristles.

3. The seal of claim 1, wherein said flexible element comprises at least one of a plurality of circumferentially spaced flexible fingers and a circumferentially extending thin plate.

4. The seal of claim 1, wherein said retaining plate further comprises a protrusion configured to orient said intermediate portion of said flexible element at the first angle.

5. The seal of claim 4, wherein said protrusion defines a rigid, circumferentially extending face disposed at the first angle.

6. The seal of claim 4, wherein said stop is positioned in spaced relation to said protrusion such that, when the rotor is operating at less than the critical speed, a space is defined between said stop and said free second end of said flexible element.

7. A rotary machine comprising:
a rotor;
a stationary portion that extends circumferentially about said rotor;
a flexible element extending circumferentially about said rotor and extending generally radially from a first end to an opposite, free second end, said flexible element coupled proximate said first end for rotation with said rotor, said flexible element configured to extend at substantially a first angle between at least an intermediate portion of said flexible element and said free second end when said rotor is operating at less than a critical speed, such that a clearance gap is defined between said free second end and said stationary portion, wherein said flexible element comprises a stiffness sufficient to orient said free second end at the first angle when said rotor is operating at less than the critical speed, and wherein said stiffness is overcome by a centrifugal force induced by said rotor operating at or above the critical speed, such that an angle at which said free second end extends increases beyond the first angle; and
a retaining plate coupled adjacent said flexible element for rotation with said rotor, said retaining plate comprising a stop configured to orient said flexible element at a second angle proximate said free second end when said rotor is operating at equal to or greater than the critical speed, such that said flexible element forms a dynamic seal between said rotor and said stationary portion.

8. The rotary machine of claim 7, wherein said flexible element comprises a plurality of brush bristles.

9. The rotary machine of claim 7, wherein said flexible element comprises at least one of a plurality of circumferentially spaced flexible fingers and a circumferentially extending thin plate.

10. The rotary machine of claim 7, wherein said retaining plate further comprises a protrusion configured to orient said intermediate portion of said flexible element at the first angle.

11. The rotary machine of claim 10, wherein said protrusion defines a rigid, circumferentially extending face disposed at the first angle.

12. The rotary machine of claim 10, wherein said stop is positioned in spaced relation to said protrusion such that, when said rotor is operating at less than the critical speed, a space is defined between said stop and said free second end of said flexible element.

13. The rotary machine of claim 7, wherein said stationary part comprises an inner ring of a diaphragm of said rotary machine.

14. The rotary machine of claim 7, wherein said flexible element is positioned downstream from said retaining plate.

15. The rotary machine of claim 7, wherein said flexible element is positioned upstream from said retaining plate.

16. A rotary machine comprising:
a rotor;
a stationary portion that extends circumferentially about said rotor;
a flexible element extending circumferentially about said rotor and extending generally radially from a first end to an opposite, free second end, said flexible element coupled proximate said first end for rotation with said rotor, said flexible element configured to extend at substantially a first angle between at least an intermediate portion of said flexible element and said free second end when said rotor is operating at less than a critical speed, such that a clearance gap is defined between said free second end and said stationary portion; and
a retaining plate coupled adjacent said flexible element for rotation with said rotor, said retaining plate comprising a stop configured to orient said flexible element at a second angle proximate said free second end when said rotor is operating at equal to or greater than the critical speed, such that said flexible element forms a dynamic seal between said rotor and said stationary portion, wherein said flexible element is positioned downstream from said retaining plate.

17. The rotary machine of claim 16, wherein said flexible element comprises a plurality of brush bristles.

18. The rotary machine of claim 16, wherein said flexible element comprises at least one of a plurality of circumferentially spaced flexible fingers and a circumferentially extending thin plate.

19. The rotary machine of claim 16, wherein said retaining plate further comprises a protrusion configured to orient said intermediate portion of said flexible element at the first angle.

20. The rotary machine of claim 16, wherein said protrusion defines a rigid, circumferentially extending face disposed at the first angle.

* * * * *